United States Patent

Volk

[15] 3,649,745
[45] Mar. 14, 1972

[54] SODIUM CONDUCTOR CABLE

[72] Inventor: Victor F. Volk, New York, N.Y.

[73] Assignee: Anaconda Wire and Cable Company, New York, N.Y.

[22] Filed: Aug. 14, 1970

[21] Appl. No.: 63,813

[52] U.S. Cl. .................................174/107, 174/DIG. 7
[51] Int. Cl. ...........................................H01b 7/18
[58] Field of Search ...............174/DIG. 7, 107, 28, 110 R

[56] References Cited

UNITED STATES PATENTS

| 3,073,889 | 1/1963 | Moore | 174/28 X |
| 3,315,025 | 4/1967 | Tomlinson | 174/107 |
| 3,344,228 | 9/1967 | Woodland | 174/107 |
| 3,389,460 | 6/1968 | Rubenstein | 174/DIG. 7 |

*Primary Examiner*—E. A. Goldberg

[57] ABSTRACT

In a sodium cable the conductor is contained within a foil sheath having a bonded, overlapped seam and bonded to a layer of polymeric composition. Apparatus for making this cable includes a pipe for the sodium and a tube former forming a tube of foil-adhesive laminate around the pipe which extends into an extruder for applying the layer of polymeric composition. A method of making the sodium conductor cable comprises continuously forming a foil-laminate tube and filling it with sodium during the extrusion operation.

7 Claims, 2 Drawing Figures

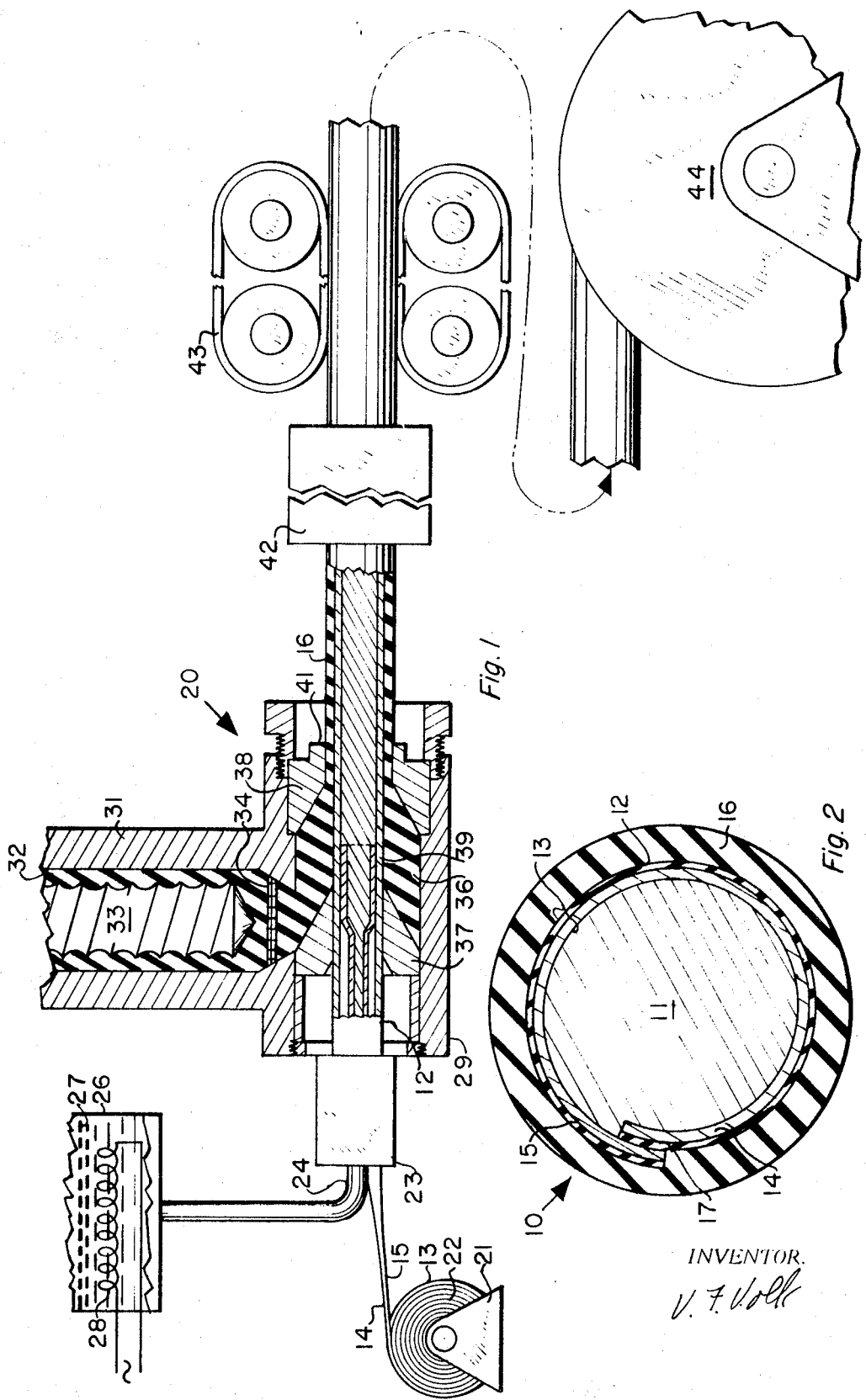

SODIUM CONDUCTOR CABLE

BACKGROUND OF THE INVENTION

It has been long ago suggested to manufacture electrical conductors by filling copper tubes with sodium and by this means taking advantage of the low cost, low density and good electrical conductivity of sodium while protecting it from contact with air or moisture. More recently sodium cables have been built by bringing molten sodium into contact with molten polyethylene within an extrusion machine and extruding a tube of polyethylene directly surrounding a sodium core.

While polyethylene is outstanding among polymeric compositions for moisture impermeability it does not compare to a metal on this score and extra-heavy walls of polyethylene are required to make a serviceable cable with a sodium conductor. The extrusion of polyethylene directly over a sodium core has introduced new hazards particularly at points in the extrusion process where the polyethylene sheath is still soft and lacking in tensile strength. The formation of a good bond between sodium and polyethylene is said to depend on their being in contact in the molten state. In an extrusion operation, however, the tube of polyethylene should have established its structural form at a point when it is solidified from its molten state in order to maintain an inside diameter of the required uniformity. As a result areas may occur within extruded cables where the polyethylene is not completely wetted by sodium, and at high voltages, as is well known in the cable art, such areas present an ionization hazard.

SUMMARY

I have invented a sodium cable in which the thickness of the polymeric insulation can be reduced to that determined by the voltage, since no added thickness is required for considerations of moisture permeability.

My cable also has a positive bonding of the metallic conductor elements to the inside of the surrounding polymeric tube that is extremely uniform since it is not dependent on having the polymeric composition in a liquid state when it contacts the conductor. Furthermore, since, from the point of its introduction into my cable, the sodium is surrounded by a metal barrier, the likelihood of emission of reactive sodium metal through interruptions of the polymeric covering, is greatly reduced.

The electric cable I have invented to avoid the shortcomings of known cable types comprises a sodium conductor, a metal foil such as an aluminum foil wrapped around the conductor with a straightaway overlapped seam, and a wall of polymeric composition, such as polyethylene, surrounding the conductor and the foil. A thin layer of adhesive film, such as a film comprising a copolymer of ethylene and acrylic acid, is bonded to the foil. This film bonds the foil to the wall of composition and also bonds the foil to itself at the overlapped seam.

In my method of making an electric cable, I continuously form a foil-adhesive laminate into a tube with an overlapped longitudinal seam. This tube is formed around a pipe that has an aperture within the newly formed tube, in such a manner that the adhesive layer is outermost. I then continue to extrude a layer of polymeric composition over the tube, thereby bonding the seam by means of the adhesive and also bonding the composition to the foil. During the extrusion of the composition I continuously eject sodium, which I may preferably have liquified at an upstream station, from the pipe to fill the tube formed therearound by the laminate.

My apparatus for making my sodium conductor cable comprises a tank containing a supply of sodium, heating means liquifying the sodium, and a pipe communicating with the tank and supplying sodium therefrom. My apparatus also comprises payoff means for a supply of foil-adhesive laminate strips and a tube former mounted downstream of the payoff means. This tube former has the purpose of forming the strip into a tube with an overlapped seam around an end of the pipe. Downstream of the former, my apparatus includes a plastic extruder comprising an extrusion head within which there is a guider and a downstream pressure chamber.

The pipe extends through the guider and has a portion within the chamber that closely fits the inside surface of the tube. The extruder also comprises means supplying hot plastic polymeric composition to the chamber where it presses the tube around the portion of pipe within the chamber, bonding the seam by means of the adhesive. The composition itself bonds, by means of the adhesive, to the foil. The chamber terminates in an extrusion die which forms the composition into a layer around the tube, and I provide means downstream of the extruder for cooling the cable, capstan means mounted downstream of the cooling means for advancing the cable and means downstream of the capstan means for taking up the cable.

BRIEF DESCRIPTION OF THE DRAWING

FIG. 1 shows a schematic side view, partly in section, of apparatus of my invention.

FIG. 2 shows a section of the cable of my invention.

DETAILED DESCRIPTION OF A PREFERRED EMBODIMENT

Referring first to FIG. 2, the cable 10 is seen in section to have a conductor 11, contained within a tube 12 formed from a laminate 13 of a strip of foil 14 bonded to an adhesive film 15. A layer 16 of polyethylene or other polymeric composition is bonded to the foil 12 by virtue of the adhesive properties of the film 14.

The tube 12 is formed with a straightaway overlapped seam 17 wherein the foil is bonded to itself by the film 15 on the outside of the inner layer of the overlap. The chief advantage of sodium as an electrical conductor is primarily an economic one based on the low cost, high conductivity and low density of this material. Although the other alkali metals and also calcium might be used in the practice of my invention, greater cost of these materials, and particularly potassium would negate any advantage. However, small quantities of these other metals might be blended into the sodium to change its melting point within the scope of my invention and the term sodium as employed herein includes sodium alloyed with small percentages of other metals. The foil is preferably aluminum having a thickness of from about 1 to 10 mils, however, copper or its alloys may also be used for the foil 14 within the scope of my invention.

The adhesive film 15 is comprised of a copolymer of ethylene and acrylic acid which has a unique ability to bond to polyethylene. A suitable copolymer is random and contains about 8 percent, by weight, of acrylic acid. It is manufactured by copolymerizing ethylene and acrylic acid under high pressure to produce a melt index of about 5 when measured by ASTM method D1238-62 T using Condition E, i.e., 190° C. and 2,160 grams load. A suitable adhesive film material is described in U.S. Pat. No. 3,315,025, but other adhesives may be used in the practice of my invention provided they are capable of bonding the foil to itself and to the layer 16. Where the layer 16 does not comprise polyethylene, a film 14, particularly selected to bond to the particular composition may be used. Suitable adhesives are known for whatever polymeric material may be chosen. Although, since the principal advantage of my cable is its extreme economy, I have preferred the most simple construction, the layer 16 need not be all of one composition but may have an outer covering particularly selected for its resistance to abrasion or to environmental conditions. For high voltage service the outer surface of the layer 16 may be semiconducting and the cable may have metal conductors wrapped around the outer surface in known manner or a shielding tape covered by a polymeric jacket, also known. A plurality of the cables 10 may be twisted together to form a cable composite or the cable 10 may be combined with other, conventional, cables. Modifications external to the cable 10 do not constitute an element of the novelty of the present invention.

Polymeric material which may in some circumstances be usable for the layer 16 or the outer portion thereof includes copolymers and terpolymers of polyethylene such as those of known type which comprise polypropylene, polyvinyl chloride, neoprene, and rubber. The use of materials which react with sodium becomes possible, of course, only because the foil 14 is an effective barrier. When such reactive materials are used for the layer 16, a thicker foil may be indicated and possibly a greater overlap at the seam 17.

An apparatus for making my cable is indicated generally by the numeral 20 in FIG. 2. A payoff stand 21 for a coil 22 of a strip of the laminate 12 is mounted to pay into a tube former 23 of which suitable types are known, such as that described in Burr U.S. Pat. No. 3,387,478. The laminate 13 is continuously formed into the tube 12 around a pipe 24 communicating with a tank 26 containing a supply of sodium 27 kept molten by means of a suitable immersion heater 28. The tank 26 is kept free from air and moisture by means of nitrogen in a known manner. In order to avoid premature melting of the adhesive film 15, the pipe 24 is substantially smaller than the inside of the tube 12 when the tube is first formed and cool air is continuously blown into the newly formed tube 12 by means not shown, of which suitable types are well known. From the former 23 the tube 12 passes into a head 29 of an extruder 31 for a stock 32 of polymeric composition which is urged in a known manner by a screw 33 through a screen pack 34 into a chamber 36 formed between a guider 37 and extrusion die 38. The tube 12 passes through the guider 37 to enter the chamber 36 and the pipe 24 also extends into the chamber. A forward portion 39 of the pipe 24 extends into the chamber 36. This portion 39 has an enlarged diameter so that it snugly fits the tube 12. Up until its entry into the guider 37 the seam 17 of the tube 12 has not been bonded, but on emerging from the guider 37 the tube 12 is heated internally by contact with the enlarged portion 39, and externally by the stock 32 which compresses the tube against the pipe portion. This application of heat effectively bonds the seam 17 and also fuses the composition to the outside of the tube by means of the reaction of the adhesive film 15 so that as the layer 16 is formed over the tube 12 by the die 38, the emerging cable is bonded both on the surface of the foil and at the foil seam. Although I have preferred to expand the diameter of the pipe 24 to form the portion 39 it will be understood that the increased diameter might be obtained by increasing the pipe wall thickness, as by the addition of a sleeve.

At a downstream face 41 of the die 38 the tube 12 is safely sealed so that any stock interruption which causes an insufficient thickness of the layer 16 at this point will still not cause a disasterous discharge of sodium into the atmosphere. The cable 10 enters a cooling trough or pipe 42 downstream of the extruder 31 trough which it has been urged by a capstan 43 to be taken up on a reel 44. Although, because of the barrier provided by my foil 14 water can safely be used in the trough 42, I prefer, for extra safety, to close this area from personnel access during operations. This precaution is not necessary if inert oil or gas are used for cooling.

I have invented a new and useful cable apparatus and method of which the foregoing description has been exemplary rather than definitive and for which I desire an award of Letters Patent as defined in the appended claims.

I claim:
1. An electric cable comprising:
   A. a sodium conductor,
   B. a metal foil wrapped with an overlapped straight-away seam directly around said conductor,
   C. a wall of polymeric composition surrounding said conductor and said foil, and
   D. a thin layer of adhesive film bonded to said foil, bonding said foil to said wall, and bonding said foil to itself at said overlapped seam.
2. The cable of claim 1 wherein said foil comprises aluminum.
3. The cable of claim 1 wherein said film comprises a copolymer of ethylene and acrylic acid.
4. The cable of claim 2 wherein said film comprises a copolymer of ethylene and acrylic acid.
5. The cable of claim 1 wherein said wall comprises polyethylene.
6. The cable of claim 3 wherein said wall comprises polyethylene.
7. The cable of claim 4 wherein said wall comprises polyethylene.

* * * * *